United States Patent
Ibar (10) Patent No.: US 7,468,404 B2
(45) Date of Patent: Dec. 23, 2008

(54) PROCESS FOR DISPERSING A THERMALLY SENSITIVE ADDITIVE INTO A MELT

(75) Inventor: Jean-Pierre Ibar, Wallingford, CT (US)

(73) Assignee: Stratek Plastic Ltd., Dublin (IE)

( * ) Notice: Subject to any disclaimer, the term of this patent is extended or adjusted under 35 U.S.C. 154(b) by 734 days.

(21) Appl. No.: 11/035,836

(22) Filed: Jan. 15, 2005

(65) Prior Publication Data

US 2005/0159527 A1    Jul. 21, 2005

Related U.S. Application Data

(63) Continuation-in-part of application No. 10/761,165, filed on Jan. 17, 2004, now abandoned, and a continuation-in-part of application No. 10/758,892, filed on Jan. 16, 2004, now abandoned.

(51) Int. Cl.
*C08C 1/10* (2006.01)

(52) U.S. Cl. .................................... 523/312; 523/313

(58) Field of Classification Search ............. 523/312, 523/313

See application file for complete search history.

(56) References Cited

U.S. PATENT DOCUMENTS

| | | | |
|---|---|---|---|
| 4,793,954 A | 12/1988 | Lee | |
| 4,935,164 A | 6/1990 | Wessling | |
| 5,290,827 A | 3/1994 | Shine | |
| 5,688,868 A | 11/1997 | Fish, Jr. | |
| 5,885,495 A | 3/1999 | Ibar | |
| 6,210,030 B1 | 4/2001 | Ibar | |
| 6,544,451 B1 | 4/2003 | Heitner | |
| 6,992,129 B2 * | 1/2006 | Benson et al. | 524/445 |
| 7,135,508 B2 * | 11/2006 | Chaiko et al. | 523/216 |
| 7,148,282 B2 * | 12/2006 | Giannelis et al. | 524/445 |
| 7,169,886 B2 | 1/2007 | Ibar | |
| 7,304,125 B2 | 12/2007 | Ibar | |
| 2002/0060379 A1 | 5/2002 | Wei | |
| 2003/0201581 A1 | 10/2003 | Weber | |
| 2005/0159548 A1 | 7/2005 | Ibar | |
| 2005/0182229 A1 | 8/2005 | Ibar | |

FOREIGN PATENT DOCUMENTS

| | | |
|---|---|---|
| DE | 38 17 234 A1 | 11/1989 |
| DE | 101 32 069 A1 | 1/2003 |
| EP | 0 736 558 A2 | 10/1996 |

OTHER PUBLICATIONS

International Preliminary Report on Patentability for PCT/US2005/001231 issued by the International Bureau of WIPO on Jul. 17, 2006.

* cited by examiner

*Primary Examiner*—Edward J Cain
(74) *Attorney, Agent, or Firm*—Baker & Daniels LLP (57) ABSTRACT

A continuous process for incorporating a thermally sensitive additive into a polymer melt of virgin polymer at a temperature at least 10° C. below a temperature at which the virgin polymer is typically processed. The virgin polymer is first processed in an apparatus which extensively shear-thins the polymer until its normally entangled molecules are substantially disentangled. This is preferably done in a TekFlow® processor. The additive is then added to the resulting modified melt which is then processed in a high-shear apparatus, e.g. a co-rotating, twin-screw extruder, but more preferably in a second TekFlow® processor. This novel process allows making concentrates having a level of additive which could not be made to date and yet have the additive substantially uniformly dispersed. In particular a concentrate of polypropylene having a 30% by wt concentration of an organoclay in which the platelets are substantially uniformly dispersed, at least 10% more strongly intercalated than prior to treatment, and substantially fully exfoliated, is made with this process.

9 Claims, 4 Drawing Sheets

PROCESS FOR DISPERSING A THERMALLY SENSITIVE ADDITIVE INTO A MELT

CROSS-REFERENCE TO RELATED APPLICATIONS

This application is a continuation-in-part application of Ser. No. 10/758,892 filed 16 Jan. 2004 now abandoned, and also of Ser. No. 10/761,165 filed 17 Jan. 2004 now abandoned, the disclosures of each of which are incorporated herein by reference thereto as if fully set forth in the following specification.

FIELD OF THE INVENTION

This invention pertains to a continuous process for dispersing a thermally sensitive additive (or, if solid, also referred to as a "filler") into a polymer melt at a temperature lower than the polymer's conventional fluidization temperature (for brevity, "fluidization temperature"). By "thermally sensitive" is meant that the additive suffers noticeable and/or unacceptable degradation or change in physical characteristics at the temperature of melt in which the additive is dispersed, such degradation being referred to as "thermal degradation".

The fluidization temperature is defined as that temperature at which the normally solid polymer is conventionally melt-processed without any processing aid to reduce viscosity, this melt-processing temperature being in the range from about 10° C. to 100° C. above the measured melt temperature (at ambient temperature of 25° C. and atmospheric pressure) for a crystalline polymer, or the glass transition temperature of an amorphous polymer, at which the polymer begins to flow. The temperature at which the additive suffers thermal degradation is lower than the fluidization temperature chosen to process the melt.

BACKGROUND OF THE INVENTION

Additives are added to synthetic resinous materials to provide products having improved performance (mechanical, chemical) and/or physical characteristics (color, surface texture); reduced sensitivity to degradation by heat, light and chemicals; lower cost; and other desired attributes. Typically, an additive is "polymer-and purpose-specific", that is, a particular additive is chosen for a particular purpose in a specific polymer. When the additive itself is in a fluid state and not a solid, addition of the additive is simplified as it can be conventionally added to virgin polymer so long as the degradation temperature of the additive is below the fluidization temperature of the polymer. By "virgin" polymer is meant, polymer which is commercially manufactured for melt-processing into articles of arbitrary shape and size. Such virgin polymer may be a single polymer having a wide range of molecular weight, or a blend of polymers and may include such polymers which are recycled.

When the additive is a particulate, finely divided solid, dispersing the additive uniformly through additive-enriched (or "additive-rich" for brevity) melt to yield a homogeneous melt is difficult, the smaller the particles, the greater the difficulty. Such difficulty is compounded when the particles are smaller (have an equivalent diameter) than 45 μm (325 mesh), and/or thermally degradable at the fluidization temperature of the polymer, and particularly so if they are required to be uniformly dispersed in the melt, and remain uniformly dispersed after the additive-rich melt is cooled and the particles try to revert to an equilibrium state. One skilled in the art is all too well aware of the difficulties of wetting, separating and stabilizing any powdery additive so it is substantially homogeneously dispersed in a solid polymer.

By "substantially homogeneously dispersed" or "uniformly dispersed" or "uniformity of dispersion" is meant that the uniformity of dispersed particles in the film may be quantified by known microscopic techniques, X-ray diffraction (XRD) analysis, or by a blown film test. In the blown film test, the polymer containing solid powder particles is extruded through a blown film apparatus which produces a thin enough film to be transparent to visible light, e.g. about 0.025 mm (1 mil) thick, and this film is placed over a light source of appropriate wavelength and intensity to enable one to quantify the number of particles which show up as "imperfections"; and the size of each is also visible under appropriate magnification. For particles in a concentration greater than about 8% by wt, "filled" melt is placed at one end of a glass slide and smeared across it with a thin blade.

Dispersion of particles is typically deemed uniform by one skilled in the art when the distribution of particles in one unit area is visually essentially the same as that in a neighboring unit area and throughout the film, and each unit area is substantially free from visually evident agglomerates. More specifically the number of particles per unit area is within about 20% or less of the average number of particles in each other unit area in the film, and the interparticle spacing per unit area is within 20% or less of the average spacing in each other unit area in the film, allowance being made for disparities in particle size. One skilled in the art knows uniformity of dispersion when he sees it.

For "nanoparticles" in the range from 1 nm (nanometer) but less than 1 μm (micrometer), e.g. nanoclay particles, the extent of intercalation and exfoliation in the polymer matrix may be determined by XRD analysis, as illustrated below. Nanoclays are typically lightweight organoclay platelets that are 200-600 nm in width and length, and 1 nm thick. See *Appliance,* August 2004, v 61 i8 p34(1).

The "melt" processed herein refers either to a single polymer or a miscible blend of two or more polymers at or above the fluidization temperature of the polymer or blend, and each polymer may be crystalline, partially crystalline or amorphous. The melt temperature of a substantially crystalline polymer or blend is that temperature at which the polymer or blend melts, typically not sharply, but over a narrow range, at ambient pressure. The "melt" temperature at which a substantially amorphous polymer or blend begins to flow is its "melt-controlling temperature", that is, the highest glass transition temperature Tg, if the amorphous polymer has more than one Tg. At, or above the fluidization temperature the polymer is said to be "melt-processable". The term "melt" is used herein to indicate fluidized melt-processable polymer at a fluidization temperature which is at least as high as the polymer's "melt" temperature, and in practice, at least 10° C. higher, typically from 20° C. to 75° C. higher.

The Problem:

The difficulty of dispersing very small particles, particularly nanoclay platelets, to obtain a uniform dispersion, maximum intercalation and exfoliation, to the extent that it can be, stems from increasing the shear which requires lowering the temperature to achieve the desired delamination effect. However, as the viscosity and shear increase, the flow equation requires that pressure increase at least 10%. This pressure increase opposes the dispersing effect of the shear delamination. Increasing the temperature to release pressure, forces one against the limitation of degradation of both the resin and the additive. As a result, in conventional dispersions of nanoclays with the strictures of the foregoing considerations, there is still present a substantial and easily detectable population of relatively large agglomerates, one does not expect to find in a matrix in which primary particles of the additive are uniformly distributed. For obvious reasons, the difficulty of obtaining substantially uniform dispersions of micron-sized and nanoparticles is exacerbated when the additive to be dispersed is thermally sensitive.

How to modify the physical and physico-chemical characteristics of a polymer, and how to make a "stress-fatigued" melt which is fluidizable at a temperature below the virgin polymer's conventional fluidization temperature, is disclosed in U.S. Pat. Nos. 4,469,649; 5,306,129; 5,494,426; 5,885,495; and 6,210,030 issued to Ibar. In the '495 process, virgin polymer, that is, polymer conventionally manufactured and purchased in the market place, is extruded to form a melt which is then led into an apparatus referred to as a TekFlow® processor, available from Stratek Plastic Ltd. (Dublin, Ireland) and SPRL Inc. (Wallingford, Conn., USA). The melt is mechanically vibrated and fatigued until the state of entanglement between the molecules has been modified to a desired level of disentanglement as measured by a decrease of at least 10% in the viscosity and melt modulus of elasticity relative to that of the virgin melt after correction of the influence of degradation of the chains, on viscosity. The resulting polymer, referred to herein as being "disentangled", "extensively shear-thinned", or "stress-fatigued" is referred to herein as "modified" polymer melt (for brevity), and is characterized by having a fluidization temperature at least 10° C. lower than the fluidization temperature of the same virgin polymer had it not been extensively shear-thinned and stress-fatigued.

The '495 patent states: "Yet, in another embodiment of the present invention, the vibrated melt per the present invention is extruded or co-extruded with other melts and additives, and pelletized just after the vibration treatment is performed to obtain solid granules or pellets of the treated melt. The extrusion is done in a way which minimizes the recovery process to take place, for example, under minimum pressure in the case the vibration treatment reduced the viscosity of the melt by extensional shear to reduce the entanglements, and conversely, under minimum shear in the case the vibration treatment increased the elasticity of the melt by favoring the interpenetration of the macro-molecules and increasing the entanglements." (see '495, col 6, lines 12-24).

It is evident that in a two-step, non-continuous process, one may disperse a thermally sensitive additive in a melt after first determining if the processor could be operated to produce a modified melt with a fluidization temperature lower than that at which the proposed additive would be degraded. In this first step, fluid polymer melt from a polymer-melting means such as a conventional extruder, is extruded into the processor, and the melt is cooled and pelletized. In the second step, if the fluidization temperature of the modified melt can be lowered to, preferably below, the degradation temperature of the additive, the additive is mixed with the pelletized, modified polymer, and melt-processed, e.g. extruded through a conventional extruder, to produce an additive-rich melt which is cooled to form a solid stress-fatigued polymer with the additive dispersed in it. In this two-step process, though the additive is thermally degradable at the fluidization temperature of the virgin polymer, it will be evident that the additive would not be degraded at the fluidization temperature of the modified melt because it would typically be at a temperature below the degradation temperature after being processed in the processor.

Referring to the patents identified above, there is no provision for introducing any material into virgin polymer being stress-fatigued in the apparatus (which fatigues the melt) after the virgin polymer is fed into the feed-inlet of the apparatus such as a TekFlow® processor, and there is no suggestion in the disclosures of the patents as to how any material may be added to the melt within the processor.

Nanoclays are typically converted to organoclays to lessen the difficulty of dispersing the platelets into a melt to form a nanocomposite. Thermal sensitivity of organoclays is usually attributable to a chemically attached binder or compatibilizing agent to improve dispersibility. These clays are nevertheless particularly difficult to substantially fully intercalate and exfoliate. See "Phase Morphology and Rheological Behavior of Polymer/Layered Silicate Nanocomposites," by Lim, et al., Rheol Acta 4: 220-229 (2001). Natural montmorillonite nanoclay, modified/coated with a quaternary ammonium salt (available from Southern Clay Products) improves stiffness, heat deflection temperature and barrier properties of the matrix in which the clay is distributed. The modified nanoclay increases intercalation ($D_{001}$ spacing) to facilitate mechanical exfoliation (i.e. separation of platelets) and dispersion of the nanoclay in a melt. The thermal stability of nanoclays, depending upon the substituent introduced, begins to decrease above about 200° C.

The extent of degradation may be determined by FT-IR spectroscopy which shows the thermal degradation of the onium compound present in the clay. Though the dispersibility and exfoliation, particularly in an aqueous environment, is improved by an organophilic substituent, there is no suggestion in the art that a nanoclay in an amount greater than 10% by weight of the additive-rich matrix, and more particularly in a range from about 10% to 30% may be homogeneously dispersed in a polymer, yet be mechanically substantially fully exfoliated. Concentrations stated as "% by weight" refer to the amount in the additive-enriched polymer.

SUMMARY OF THE INVENTION

A continuous process is disclosed for incorporating an additive which cannot be acceptably introduced by admixing it with virgin polymer prior to forming a melt, for any one or more of several reasons: (a) the additive is thermally degraded when subjected to the chosen fluidization temperature of the virgin polymer; (b) in addition, the additive fails to be substantially homogeneously dispersed in the virgin polymer melt; (c) when the additive is a nanoparticulate powder, the particles are not strongly intercalated in virgin melt, that is the $D_{001}$ spacing is increased less than 20%, and not substantially fully exfoliated in the cooled virgin melt, that is less than 50% of the particles are exfoliated.

It has been discovered that finely divided particles such as of a nanoclay, or any thermally sensitive additive powder, may be added to a polymer melt flowing from a stress-fatiguing means such as a TekFlow® processor, operated without external pressure but with sufficient energy being additionally supplied by another mixing means, preferably another TekFlow® processor, similarly operated, so that the particles are substantially uniformly dispersed in the melt; nanoclays are intercalated and exfoliated in the modified melt in an amount up to 40%, and micron-sized powders may be dispersed in a melt in an amount up to 50% by weight, an extent not feasible to date, without having more than 20% by wt of the particles present as agglomerates. Particles in the size range from 1 µm to about 212 µm are referred to as "micron-sized" particles. Such uniformity of dispersion is obtained without the necessity of a co-additive such as a dispersing agent, plasticizer, processing aid or compatibilizer conventionally used to lower the fluidization temperature.

The process disclosed herein comprises, continuously feeding fluid, unmodified polymer at or above its fluidization temperature into a feed-inlet of a stress-fatiguing means for extensively shear-thinning the unmodified polymer, e.g. a TekFlow® processor, for substantially disentangling molecules of the polymer so as to lower the temperature of entering fluidized modified polymer by at least 10° C., preferably in the range from about 20° C. to 50° C., at the discharge-end of the first stress-fatiguing means in the absence of a dispersing agent, processing aid or compatibilizer; introducing a thermally sensitive solid particulate additive, e.g. a finely divided powder, in a size range from about 10 nm to 212 μm (No. 70 mesh), into the fluidized polymer at the discharge end of the first stress-fatiguing means to yield an additive-rich melt flowing into a feed-inlet of a mixing means, e.g. an extruder, or more preferably, a second stress-fatiguing means; providing sufficient work input (energy of mixing) in the mixing means to disperse the additive substantially homogeneously throughout the modified, additive-rich melt; and, cooling the additive-rich melt to solidify the melt, so as to maintain additive particles substantially homogeneously dispersed throughout the cooled, solid polymer. It will be evident that, if the desired dispersion, free from more than 20% agglomerates is obtained without a dispersing agent, any such co-additive may be added in an amount less than 1% by wt, if desired.

In a preferred embodiment, the mixing means is a second TekFlow® processor, and the power input per unit volume of additive-rich melt is supplied without raising the temperature of the melt by more than 10° C. above the temperature of the additive-rich melt at the feed-inlet of the mixing means; more preferably, resulting in an effluent of melt with substantially uniformly dispersed additive, preferably at a temperature below the temperature of the additive-rich melt at the feed-inlet of the processor.

The work or power input per unit volume of melt, for dispersing the additive in the modified melt is substantially less, typically from 10% to 50% less than would be required in the unmodified melt since the molecules have been substantially disentangled. The actual power input required is a function of the rheological properties of the melt at the mixing temperature, the particle size (range) and concentration of the additive to be incorporated into the melt, the desired extent of dispersion, the particular mixing means used, and the throughput at which the mixing means operates.

Correspondingly, the throughput of the mixing means is typically improved by a percentage of the foregoing determining factors, typically providing from about 10% to 50% higher throughput than would conventionally be provided. A typical power input for a TekFlow® processor to disperse a particulate polyaniline additive in the size range from about 1-45 μm in a concentration range from about 5% to 30% by weight of modified polycarbonate melt having a number average molecular weight Mn in the range from 50,000 to 200,000, is in the range from about 100-1000 Joules/ml.

A particular object of the invention is to provide a process which is effective to substantially uniformly disperse particles in an extensively stress-thinned polymer melt, whether the particles are of a nanoclay in the size range from 10 nm to less than 1 μm (referred to as "nano" particles); or, of an inorganic material such as alumina trihydrate, $Al_2O_3 \cdot 3H_2O$ or bayerite (ATH), or, an organic material such as micron-sized wood flour or polyaniline.

BRIEF DESCRIPTION OF THE DRAWING

The foregoing object and additional advantages of the invention will best be understood by reference to the following detailed description, accompanied with the schematic illustration of a preferred embodiment of the invention, in which.

DETAILED DESCRIPTION OF THE INVENTION

A thermally sensitive additive, as referred to herein, includes particulate organic and inorganic reinforcing additives such as electrically conducting polymers, e.g. polyaniline powder, but also other polymer-modifying additives such as nanoclays, pigments, adjuvants, and solid (at room temperature) polymers, including homopolymers such as waxes, and elastomers, particularly block copolymers of a vinyl aromatic compound and a conjugated diene, and other materials, all of which are conventionally added to a polymer, for one reason or another. The term "adjuvant" is used interchangeably with the term additive, but more specifically refers to one or more of the following: an emulsifier, perfume, coloring dye, surfactant, processing aid, bactericide, opacifier and the like.

Though finely divided solid particles may be directly dispersed in a polymer, they are not homogeneously dispersed unless sufficiently "wetted" by the molten polymer, and this requires mixing with a work input of much shear energy. Excessive work input leads to excessive heat generation and degradation of both polymer and additive, and to unnecessary expense. The higher the desired concentration of additive, the more difficult the dispersion. Therefore in practice, it is preferable, first to distribute the particles in a first polymer which wets the particles sufficiently to have them homogeneously distributed in the first polymer, thus forming a concentrate. The concentrate is preferably comminuted and macrogranules of the concentrate are then mixed with a second polymer to form a thermoformable mixture which is extruded, or injection- or blow-molded.

Of particular interest, and well known to those skilled in the art, for their utility as additives, are thermally sensitive, nanotubes and naturally occurring and synthetic nanoclays. These nanoclays may be either substantially crystalline or amorphous layered clays. Nanotubes may be up to 1 cm long but have a diameter of about 50 nm. The clays are typically smectites, kaolins, illites, chlorites, attapulgites and the mixed layer clays. Smectites include montmorillonite, bentonite, etc.; kaolins include kaolinite, dickite, etc.; illites include bravaisite, muscovite, etc.; attapulgites include sepiolite and polygorskyte. Mixed layer clays include allevardite and vermiculitebiotite. Any of a wide range of these materials, if thermally sensitive, may be used as additives in the process described herein.

The illustrative examples herebelow teach adding a micron-sized inorganic powder of thermally sensitive alumina trihydrate (ATH), finely divided wood flour, polyaniline powder and a nanoclay; each added in a relatively high concentration to demonstrate the unexpectedly high extent to which each may be uniformly dispersed. The uniformity of dispersion, intercalation and exfoliation of a nanoclay at 30% by wt provides an especially desirable concentrate, usually as macrogranules. The modified solid, additive-rich polymer obtained may then be "let down" (diluted) into another polymer, the same or different from the modified polymer. It will be evident that, if a relatively low concentration, from about 0.5% but less than 5% of additive is to be added, the desired concentration may be obtained directly, without first making a concentrate.

Figure 1:
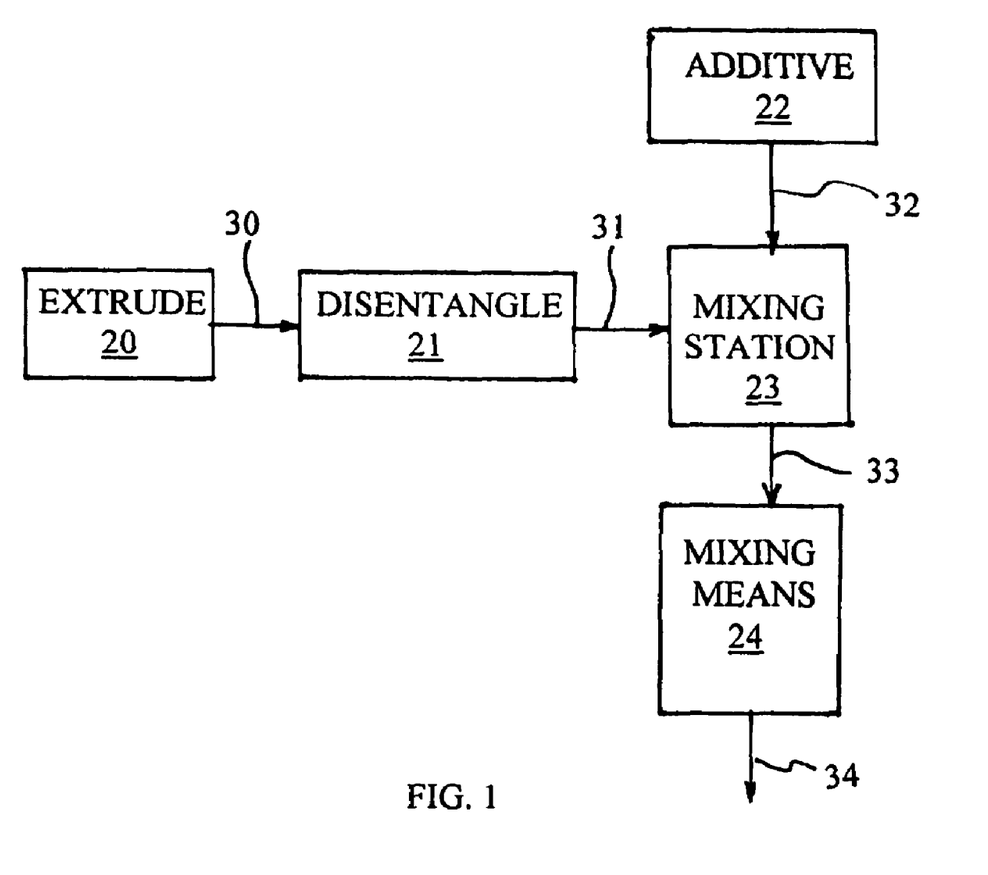
FIG. 1 schematically illustrates the process flow in a system in which a melt of virgin polymer is stress-fatigued, extensively shear thinned and the molecules substantially disentangled, fed to a mixing station where an additive is added to the melt to yield an additive-rich melt.

Referring to FIG. 1, there is illustrated a basic system comprising a conventional melt-processing means, e.g. an extruder 20, a stress-fatiguing means 21 (TekFlow® processor), an additive supplying means 22, typically a screw-feeder operating at a pressure in the range from about 2 to 10 atm, and a mixing means 24 with a interposed mixing station 23, this being a location where the additive is introduced into the flowing melt intermediate the stress-fatiguing means and the mixing means 24. The mixing means 24 may be a second conventional melt-processing means, e.g. an extruder, but is preferably a second TekFlow® processor.

In operation, virgin polymer (not shown) is fed to and extruded from the extruder 20 at a chosen fluidization temperature in the range from about 20° C.-100° C. above the fluidization temperature of the virgin polymer; extrudate 30 from extruder 20 is flowed continuously to the stress-fatiguing means 21. After being shear-thinned, the melt-fatigued effluent 31 is led to the mixing station 23 where an additive is continuously metered by additive-supplying means 22, through conduit 32, to form an additive-rich, stress-fatigued melt 33. The melt 33 is led into the feed inlet of mixing means 24 which supplies a sufficiently high power input per unit volume of melt to obtain the extent of dispersion desired. Additive-rich stress-fatigued melt 34 having the additive substantially uniformly dispersed therein is recovered and cooled. The cooled solid is tested for, and found to have the additive substantially uniformly dispersed therein.

It will be appreciated that the power input per unit volume of material in each processor will vary depending upon a host of variables including the physical characteristics of the polymer, those of the additive, the concentration of the additive, the temperature range in which the processor (21) and the mixing means (24) are operated, the design parameters of each shear-thinning apparatus, and most importantly, the degree of disentanglement, and level of exfoliation sought in the processed additive-rich melt. When (21) and (24) are each a processor, the power requirement for the first processor is in the range from 0.5 HP/(kg/hr) to 75 HP/(kg/hr), and is typically higher than the requirement for the second processor which will usually operate in the range from about 2 HP/(kg/hr) to 10 HP/(kg/hr). However, it will be realized that it is not essential that the second processor or conventional extruder be operated with a lower power requirement than the first.

The range within which a fluidization temperature is chosen for melt-processing each of several common polymers to be additive-enriched, is presented in Table 1 below, it being recognized that the chosen fluidization temperature for operation is at or above a fluidization temperature in the range, and operation at a temperature above the range is usually unnecessary and uneconomical even if the polymer is not thermally sensitive.

TABLE 1

Ranges of Conventional Fluidization Temperature for Common Polymers

| Polymer | Range (°C.) |
| --- | --- |
| Polyethylene (PE) | 180-220 |
| Polypropylene (PP) | 205-235 |
| Polycarbonate (PC) | 265-315 |
| Polyamide (PA) | 270-300 |
| Polystyrene (PS) | 220-240 |
| Polyethylene Terephthalate Glycol (PETG) | 260-280 |
| Polyethylene Terephthalate (PET) | 250-275 |
| Polymethyl Methacrylate (PMMA) | 220-240 |

EXAMPLE 1

Maple wood flour, Woodex 12010 (from American Wood Fiber), has a particle size <180 µm, about 65% of the particles <106 µm; the particles are to be dispersed in polypropylene (PP) (BP Amtuff 103463) having a melt flow index of 15.0 g/10 min (230° C./2.16 kg) at 160° C., without the use of processing aids for reducing viscosity. The fluidization temperature of this virgin PP is about 230° C.; the wood flour is significantly degraded at 200° C. Though uncoated wood flour may be added, the Woodex flour is provided with a coating of an emulsion of polyurethane latex which is dried and cured at 90° C. for 2 hours is about 15% by wt. As received, the Woodex flour has about 10% by wt moisture, and when dried has less than 1% by wt. The coating is not a processing aid.

The problem of dispersing such wood flour is discussed in "Properties of Injection-Moldable Blends of (Latex/Wood Flour Recipes) in Polypropylene" (SPE for Antec, Paper No. 1074, May 2004).

In the solution provided herein, first (21) and second (24) TekFlow processors are used in the system, connected through a mixing station (23) which accepts disentangled melt from the outlet of the first processor and feeds additive-enriched melt to the inlet of the second processor.

Virgin PP is fed to a single screw extruder (20) operating at an average barrel temperature of abut 230° C. and the extrudate (30) flowed at this temperature, to the inlet of the first processor (21); effluent (31) from the first processor is at about 180° C. and is mixed in the mixing station (33) at this temperature. The mixing station may be an enlargement in the line through which effluent (31) flows, and into which enlarged section the wood flour is introduced at a rate sufficient to provide a concentration of 15% by weight in the melt. The additive-rich melt is then led to the second TekFlow® processor in which the temperature of the first stage is held at 180° C., successive stages being held at sequentially lower temperatures so that the effluent from the second processor is at about 160° C. The second processor provides sufficient shear energy to discharge a melt which is further stress-fatigued, and in which the wood flour particles are substantially uniformly dispersed.

An effluent of additive-rich melt from the second processor having a slit die 4.0 cm wide and 0.5 cm high, is recovered as a flat strip which is air cooled then pelletized. A portion of the pellets is used to form a film about 25 µm thick, and examined against a light. The film is found to have the wood flour having fewer than 10% visually discernible agglomerates, and is deemed to have the flour particles substantially homogeneously dispersed in it. Since the wood flour was never exposed to a temperature high enough to cause degradation, it suffers no degradation.

The viscosity of the plastic melt is quantitatively followed by measuring the torque required to turn the shaft at given RPM, and the power input per milliliter is calculated as the energy required to provide the torque.

It will be understood that the foregoing operation is preceded by starting up the system by initially feeding only polymer melt from the conventional extruder through each apparatus 20, 21, 23 and 24 in the system. As the viscosity of the virgin melt is reduced in the first processor (21), the temperatures in successive individual stages of the first processor are adjusted over a period of from about 20 min to 1 hour, until effluent (31) reaches about 180° C. Similarly, the temperatures in successive individual stages of the second processor (24) are adjusted over a period of from about 20 min to 1 hour, until its effluent (34) reaches about 160° C. Then the single-screw extruder feeding additive to the second processor (24) is started to feed the wood flour into the modified melt flowing through the mixing station.

In another embodiment, in which a conventional co-rotating twin-screw extruder is used instead of a second processor, the additive-rich, stress-fatigued melt is led into a vertical co-rotating twin-screw co-extruder into which the wood flour is also fed. The temperature of the wood flour fed to the co-extruder is held at 160° C.

It will now be evident that, since uniformity of dispersion essentially without thermal degradation is achieved by first shear-thinning virgin polymer, any co-additive may also be added. If such additional co-additive is thermally sensitive, its degradability is determined by the temperature ranges in which the processor (21) and the mixing means (34) are operated.

Figure 2:
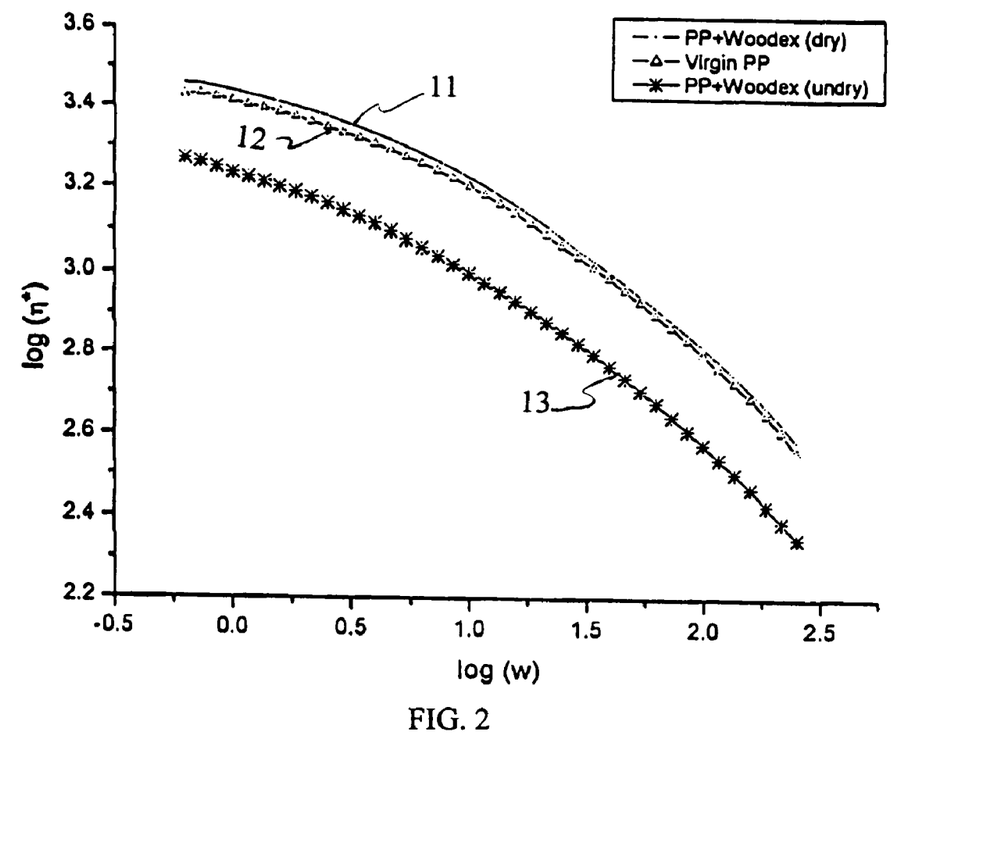
FIG. 2 depicts the results of viscosity as a function of frequency for virgin PP, modified PP enriched with 15% by wt wood-four; two curves are presented for the enriched PP, one with dry wood-flour, the other with undried wood-flour, as received.

Referring to FIG. 2 there is shown graphs of viscosity quantified on the ordinate as log ($\eta^*$) and radial frequency quantified as log ($\omega$) along the abscissa over a range of 1.5° to 70° in steps of 0.020°. In this graph the first curve 11 is for modified PP enriched with dry wood-flour; the second curve 12 is for virgin (not modified) PP only; and the third curve 13 is for modified PP enriched with undried, as-received, wood-flour.

It is evident that the viscosity curve (12) for virgin PP is close to that of modified PP enriched with dried PP (11) Woodex wood-flour; it would be expected that enriching any such PP with 15% by wt wood-flour, dried or not, would increase the viscosity of the modified PP substantially higher than that of virgin PP—but such a relatively high amount of wood-flour in modified PP does not.

The viscosity curve for virgin PP enriched with 15 wt % wood-flour is much higher than not curve 11 and is not shown because the wood-flour was degraded.

EXAMPLE 2

15% by weight of polyaniline powder, having particles in the size range from about 3-100 µm (from Ormecon Ami), is to be dispersed in polyethylene terephthalate glycol (PETG) without the use of processing aids for reducing viscosity. The fluidization temperature of this virgin PETG is about 260° C.-280° C.; the polyaniline is significantly degraded in the range from 230° C.-240° C. As in Example 1, first and second TekFlow® processors are used in the system, connected through a mixing station which accepts disentangled melt from the outlet of the first processor and feeds additive-enriched melt to the inlet of the second processor.

The PETG is extruded through a single-screw extruder (20) in the barrel of which, each zone is at about 265° C.; and the extrudate flowed into a first TekFlow processor (21) "tuned" as described above, to provide the desired temperatures of shear-thinned melt in each successive stage including the last, namely about 190° C. In a manner analogous to that described hereinabove in Example 1, polyaniline powder is fed through a feeder (20) calibrated to discharge 15 wt % of the powder into modified PETG melt (31) at the mixing station (23) and subsequently, additive-rich PETG is fed into the inlet of second processor (24); as before, the processors are appropriately "tuned" as described above, to provide the desired temperatures of additive-rich, shear-thinned melt, namely, the first stage, near the inlet of the second processor, is at about 190° C. and the last stage is at about 180° C. after which it is discharged as effluent (34). The effluent (34) strip from the second processor is cooled, pelletized, and portions used to provide film samples 25.4 µm thick, as before.

The first processor is desirably operated to provide extensive shear-thinning, and disentanglement sufficient to reduce the viscosity of the virgin polymer in the range from 10%-30%; and, in the absence of an additive, the second processor is desirably operated to further reduce the viscosity so it is in the range from 30%-60% lower than that of virgin melt; though addition of the additive inevitably raises the viscosity of additive-free melt, it is found that a melt having from 10-20% by wt additive, when treated in a second processor, typically has a viscosity approximately 10% to 20% higher than the same as virgin additive-free polymer, and may be substantially the same.

The samples are examined under 50× magnification and found to have the polyaniline particles substantially uniformly dispersed. Degradation of more than 5% of the particles is evidenced by a dark blue coloration of the film, the conductivity of which is substantially the same as colorless and transparent PETG film of virgin polymer, about $(10^{15}$ ohm/sq$)^{-1}$. Thermal degradation is also checked by TGA analysis using a TG50 from Mettler, and found to be less than 5%, indicating the particles are essentially free from thermal degradation.

Viscosity and power requirements are monitored and controlled as before, as are heating and cooling of individual stages in each processor. Electrical conductivity of each of several strips of film is measured; they are substantially identical, indicating the conductive particles are substantially uniformly distributed.

EXAMPLE 3

30% by wt of Nanoclay Particles are to be Dispersed in Low Density Polyethylene (LDPE):

The Bentone 108 nanoclay particles (from Elementis) have a primary particle size in the range from about 10 nm-200 nm and a thickness of about 1 nm. This nanoclay is an organo-hectorite having a quaternary ammonium component which provides organophilic particles compatible with a wide variety of synthetic resinous materials. It is known that exfoliation of this nanoclay may be accelerated by increasing temperature, but exposure to 200° C. for 15 min, or 250° C. for 5 min, tends to produce unacceptably high degradation of the onium salt. Before being processed the nanoclay is dried at 60° C., overnight.

Ultrathene 635-000 low density polyethylene (LDPE) from Equistar is a LDPE copolymer with vinyl alcohol, has a melt flow index of 1.0 g/10 min (190° C./2.16 kg) (ASTM D-1238), and a density of 0.93 g/cc. It is used to prepare the masterbatch with the nanoclay concentrate. The let down resin is another Equistar LDPE, Petrothene NA 960 000 with melt index 1.0/g/10 min, and a density of 0.919 g/cc. The fluidization temperature range for the LDPE is from about 180° C.-200° C., and it is impractical to process the Bentone clay in this temperature range over the time required to obtain a substantially uniform dispersion, if such could be obtained.

In a manner analogous to that described in Examples 1 and 2 above, the system is operated with tandem first and second processors, the clay being metered into the melt at the mixing station in the amount of 30% by weight of the modified melt. Melt (30) of LDPE at 190° C. from single screw extruder (20) is fed to first processor (21) tuned to discharge modified LDPE melt at 170° C. into mixing station (33) where it is mixed with 30% by wt of the clay fed through feeder (22) to provide clay-rich melt to the second process (24) which is tuned to discharge modified clay-rich melt through the last stage of the processor at 135° C. to issue from a slit die as a strip which is cooled and pelletized as before.

As in Example 2 above, portions of the pellets are used to provide samples of nanoclay-filled LDPE 25.4 µm thick, as before. The samples are examined under 1000× magnification and less than 5% of the amount of the nanoclay is visible, indicating the presence of agglomerates. particles substantially uniformly dispersed. Thermal degradation, checked by TGA analysis using a TG50 from Mettler, is found to be less than 5%, indicating the particles are essentially free from thermal degradation. The concentration of nanoclay particles is determined to be 29.8% by wt.

A typical XRD pattern of Bentone 108 is a $D_{001}$ crystal plane spacing at about 24 Å, a $D_{002}$ spacing at about 12 Å and a $D_{060}$ crystal plane around 61° which is often a marker for the presence of hectorite clay.

Pellet of this clay-enriched LDPE may be "let down" or diluted in a conventional extruder to provide lower concentrations of clay which are also uniformly dispersed and substantially fully exfoliated. As already mentioned, the "let down LDPE" resin has a much lower melt flow index corresponding to a much greater tensile strength for the processed polymer. Yet the dilution from the masterbatch, using a conventional single screw extruder, resulted in a miscible blend having a single phase in which blend exfoliated nanoclay particles are substantially uniformly dispersed.

Figure 3:
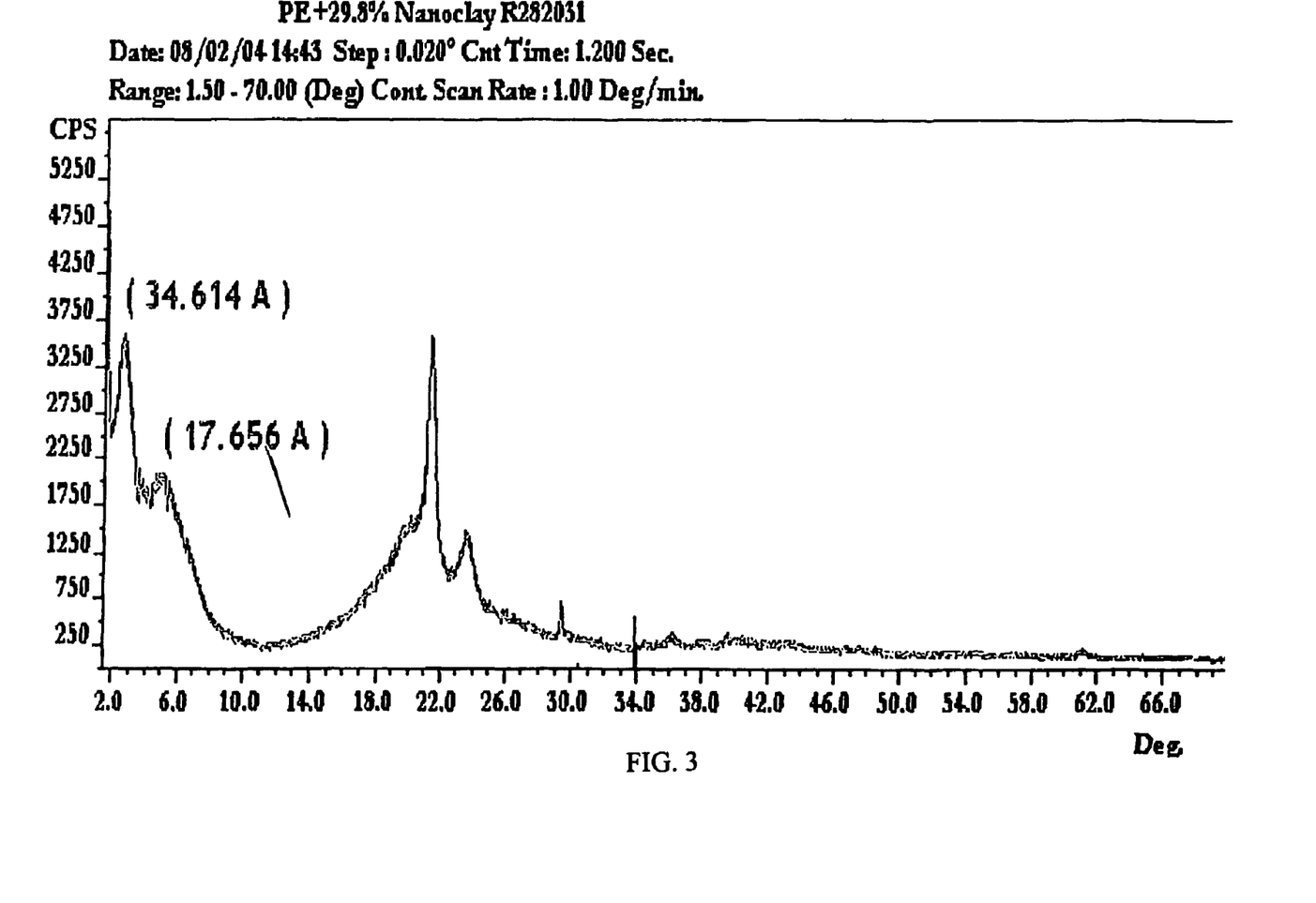
FIG. 3 is a trace indicative of the XRD pattern in a high-concentration sample ("concentrate") containing 29.8% Bentone 108 in Ultrathene-635000 LDPE.

Referring to FIG. 3, there is shown the XRD pattern of the 29.8% by wt clay particles indicating essentially all nanocomposites having strongly intercalated platelets with a $D_{001}$ spacing at 34.6 Å, compared to the initial spacing of 24 Å. Furthermore, the peak strengths being relatively low in view of the concentration of nanoclay in the samples, shows that most of the nanoclay is present as exfoliated platelets.

The samples are also examined under 50× magnification and found to have the nanoclay particles substantially uniformly dispersed. Thermal degradation is also checked by TGA analysis (sample is heated to 800° C. to remove the LDPE matrix, then cooled to 23° C.) and degradation found to be less than 5%, indicating the particles are essentially free from thermal degradation.

Referring to FIG. 3 the trace indicates strongly intercalated platelets (with a $D_{001}$ spacing at 34.6 Å) compared to the initial $D_{001}$ spacing at 24 Å of the organoclay. Furthermore, it is evident that the peak strengths are relatively low (in view of the high concentration), showing that not only more than 50% of agglomerates have been dispersed, most of the nanoclay is but that more than 80% of the agglomerates are present as exfoliated platelets.

Figure 4:
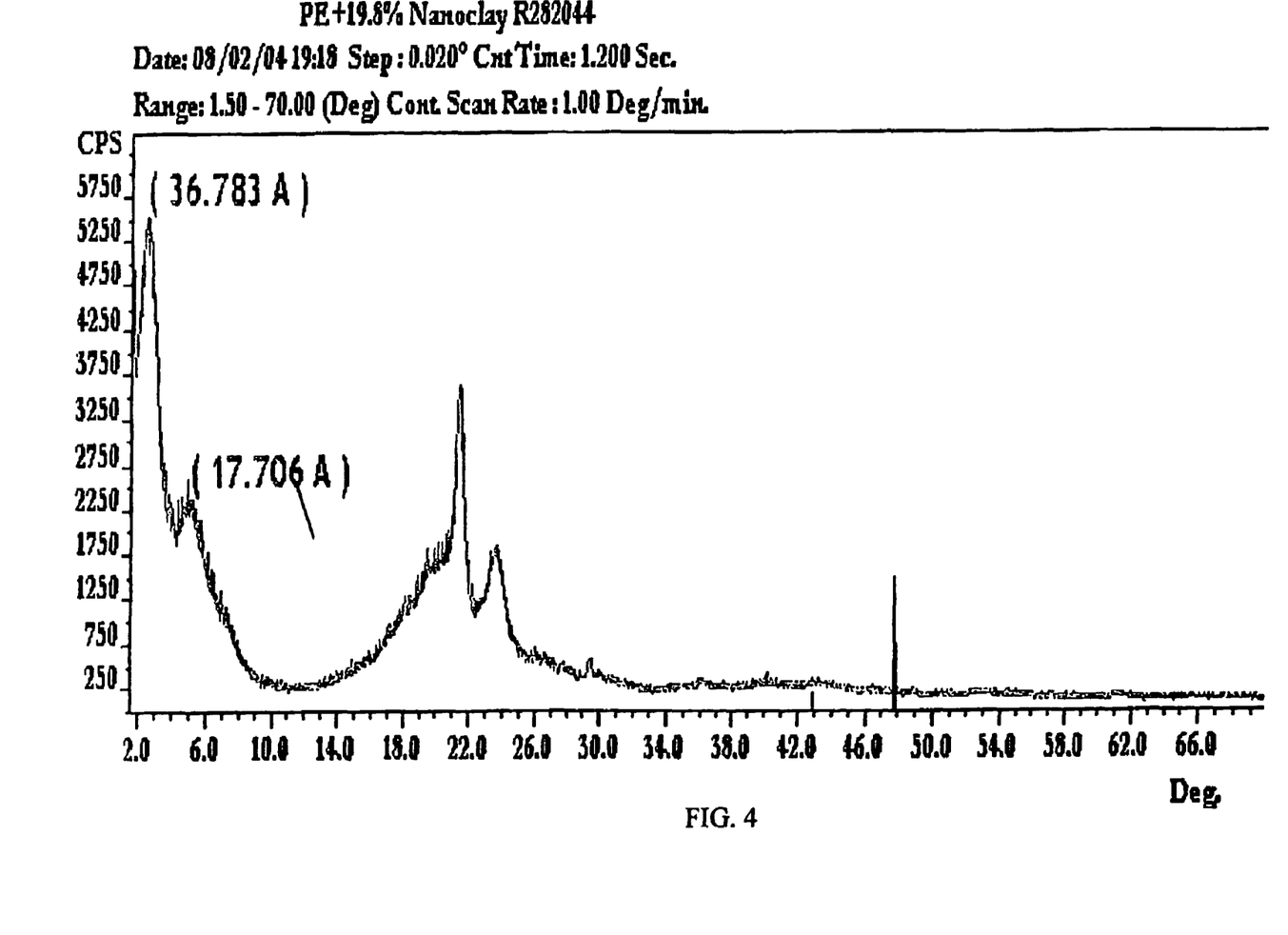
FIG. 4 is a trace indicative of the XRD pattern in a sample of the concentrate after it is "let down" into Petrothene NA 960-000 to contain 19.8% Bentone 108.

Referring to FIG. 4, since the concentration of nanoclay is lower in the sample, and the platelets have been further dispersed by being extensively shear-thinned in a second mixing means, one would expect, and the $D_{001}$ spacing at 36.8 Å, confirms that substantially all the nanoclay platelets have been uniformly dispersed.

Comparison with Conventional Twin-screw Extruder:

A masterbatch is prepared by mixing 30% by wt of the same Bentone 108 with the same Ultrathene LDPE as used before, and the mixture fed to a Leistritz 27 co-rotating twin-screw extruder operating with an average barrel temperature of 190° C. The operation is commenced by feeding virgin LDPE and the masterbatch mixture is gradually added. As the ratio of masterbatch increased the torque was increased; when only the masterbatch was being fed a screw fractured.

EXAMPLE 4

20 wt % of ATH having particles in the size range from about 20-106 µm, with the majority being <45 µm, is to be dispersed in PET without the use of processing aids for reducing viscosity:

The ATH, when heated to 200° C. decomposes into 66% alumina and 34% water and cannot be used to fill a higher-fluidization-temperature polymer matrix, e.g. polyethylene terephthalate (PET) which is melt processed at about 270° C. In addition, since the higher the surface area of a flame retardant, the more effective it is, desirable flame retardants, e.g. ATH powders are made in narrow size ranges from 2 µm-5 µm so as to offer from 4-7 m²/g of surface area, and even as nanoparticles smaller than 1 µm, the smaller, the better. However, the smaller the particles the greater the problem of obtaining a substantially uniform dispersion.

As in Example 1, first and second TekFlow® processors are used in the system, connected through a mixing station which accepts disentangled melt from the outlet of the first processor and feeds additive-enriched melt to the inlet of the second processor; as before, PET is extruded through extruder (20) at about 270° C.; and the extrudate flowed into a first TekFlow® processor (21) "tuned" as described above, to provide the desired temperatures of shear-thinned melt in each successive stage including the last, namely about 180° C. In a manner analogous to that described hereinabove in Example 1, ATH powder is fed through a feeder (20) calibrated to discharge 20 wt % of the powder into modified PET melt (31) at the mixing station (23) and subsequently, additive-rich PET is fed into the inlet of second processor (24) tuned to deliver modified melt at about 170° C. after which it is discharged as effluent (34). The effluent (34) strip from the second processor is cooled, pelletized, and portions used to provide film samples 25.4 µm thick, as before.

The samples are examined under 50× magnification and found to have ATH particles which are substantially uniformly dispersed, and the film has no visible bubbles, indicating no visible degradation. Thermal degradation of as little as 0.1% of the powder would be evident by bubbles in the film.

From the foregoing it will now be evident that the low temperature processing afforded by any apparatus capable of extensively shear-thinning a melt to lower its fluidization temperature, in a manner comparable to a TekFlow processor, will be effective to provide disentanglement of the polymer molecules so as to form a substantially uniform dispersion of both micron-sized and nanoparticles even at relatively high concentrations in a melt which could not be processed in conventional apparatus, e.g. an extruder.

Having thus provided a general discussion, described the overall process in detail and illustrated the invention with specific illustrations of the best mode of making and using it, it will be evident that the invention has provided an effective solution to an old and difficult problem. It is therefore to be understood that no undue restrictions are to be imposed by reason of the specific embodiments illustrated and discussed, and particularly that the invention is not restricted to a slavish adherence to the details set forth herein.

I claim:

1. A process for incorporating an additive into a fluid virgin polymer melt comprising:
   providing a polymer melt comprising virgin polymer to a first stress-fatiguing means;
   stress-fatiguing the polymer melt to obtain a stress-fatigued polymer melt;
   adding a thermally sensitive particulate additive to the stress-fatigued polymer melt, the stress-fatigued polymer melt being at a temperature at least 10° C. lower than the fluidization temperature of the virgin polymer, to yield an additive-rich melt, and the fluidization temperature being above the degradation temperature of the additive;
   feeding the additive-rich melt into a feed-inlet of a mixing means; and
   providing sufficient energy of mixing in the mixing means to disperse the additive substantially uniformly throughout the additive-rich melt without raising the temperature of the additive-rich melt by more than 10° C.

2. The process of claim 1 wherein the additive comprises particles in a size range from about 10 nm to 212 μm.

3. The process of claim 2 wherein the temperature of the polymer melt entering the first stress-fatiguing means is at least 10° C. below the temperature of the polymer melt leaving the first stress-fatiguing means.

4. The process of claim 3 wherein the mixing means is a second stress-fatiguing means.

5. The process of claim 3 wherein the additive is selected from the group consisting of flame retardant, conductive polymers, light stabilizers, thermal stabilizers, antistatic agents, biocides, coupling agents, peroxides, blowing agents, pigments, nanoclays, and a combination of one with another.

6. The process of claim 3 wherein the virgin polymer is selected from the group consisting of a substantially crystalline polymer, a substantially amorphous polymer and a partially crystalline polymer, and the melt is essentially free of a dispersing agent.

7. The process of claim 3 wherein the additive is selected from the group consisting of alumina trihydrate, wood flour, polyaniline polymer and an organoclay.

8. The process of claim 3 wherein the additive comprises nanoparticles in a concentration between about 1% to 40% by weight.

9. The process of claim 3 wherein the additive comprises micron-sized particles in a concentration between about 1% to 50% by weight.

* * * * *